United States Patent
Campello et al.

(10) Patent No.: US 9,022,123 B2
(45) Date of Patent: May 5, 2015

(54) SCUTTLE FOR THE MONITORING AND INSPECTION OF A FLEXIBLE RISER

(71) Applicant: Petróleo Brasileiro S.A.—Petrobras, Rio de Janeiro (BR)

(72) Inventors: George Carneiro Campello, Rio de Janeiro (BR); Sergio Ricardo Kokay Morikawa, Rio de Janeiro (BR)

(73) Assignee: Petroleo Brasileiro S.A.-Petrobras, Rio de Janeiro (BR)

( * ) Notice: Subject to any disclaimer, the term of this patent is extended or adjusted under 35 U.S.C. 154(b) by 0 days.

(21) Appl. No.: 14/272,275

(22) Filed: May 7, 2014

(65) Prior Publication Data

US 2014/0246201 A1 Sep. 4, 2014

Related U.S. Application Data

(63) Continuation of application No. 13/399,204, filed on Feb. 17, 2012, now abandoned.

(30) Foreign Application Priority Data

Feb. 18, 2011 (BR) ...................... 1100228

(51) Int. Cl.
| | | |
|---|---|---|
| E21B 33/038 | (2006.01) | |
| E21B 33/035 | (2006.01) | |
| E21B 33/076 | (2006.01) | |
| E21B 43/01 | (2006.01) | |
| E21B 17/01 | (2006.01) | |
| E21B 47/00 | (2012.01) | |
| E21B 17/00 | (2006.01) | |

(52) U.S. Cl.
CPC ............ *E21B 47/0002* (2013.01); *E21B 17/00* (2013.01); *E21B 17/01* (2013.01); *E21B 47/0001* (2013.01)

(58) Field of Classification Search
USPC ................. 166/336, 337, 344, 346, 350, 367; 285/93, 284.1; 138/36, 104
See application file for complete search history.

(56) References Cited

U.S. PATENT DOCUMENTS

| | | | | | |
|---|---|---|---|---|---|
| 399,390 | A | * | 3/1889 | Eareckson | 137/527 |
| 693,092 | A | * | 2/1902 | Weitz | 340/320 |
| 828,108 | A | * | 8/1906 | Graham | 184/96 |
| 1,042,730 | A | * | 10/1912 | Walquist | 116/276 |
| 1,063,996 | A | * | 6/1913 | Moore | 285/238 |
| 1,505,683 | A | * | 8/1924 | Wyatt et al. | 285/58 |
| 1,539,917 | A | * | 6/1925 | Smith | 222/159 |
| 2,236,937 | A | * | 4/1941 | Clark | 285/93 |
| 2,423,745 | A | * | 7/1947 | Wolfram | 285/234 |

(Continued)

FOREIGN PATENT DOCUMENTS

BR PI0801011-0 11/2010

*Primary Examiner* — Matthew Buck
*Assistant Examiner* — Edwin Toledo-Duran
(74) *Attorney, Agent, or Firm* — Nixon & Vanderhye P.C.

(57) ABSTRACT

The present invention relates to an apparatus for inspecting and monitoring flexible collection and production lines in real time, rendering possible constant tracking of the condition of the internal structures of a flexible riser, specifically of the tensile armor thereof.

The device may be provided at any point along the riser ensuring the establishment of an area of physical and visual contact directly over the surface of the tensile armor of the riser for the installation of equipment for analysis, which area permits further accesses without destroying the sealing of the chamber there formed.

15 Claims, 5 Drawing Sheets

(56) References Cited

U.S. PATENT DOCUMENTS

| | | | | |
|---|---|---|---|---|
| 2,601,359 | A | * | 6/1952 | Berwick .................... 222/156 |
| 2,687,108 | A | * | 8/1954 | Walker ..................... 116/276 |
| 2,705,092 | A | * | 3/1955 | Woodruff ................... 222/156 |
| 2,842,089 | A | * | 7/1958 | Midkiff .................... 116/276 |
| 3,087,745 | A | * | 4/1963 | Rumbell ................... 285/222.1 |
| 3,124,156 | A | * | 3/1964 | Eskin ...................... 137/559 |
| 3,299,417 | A | * | 1/1967 | Sibthorpe ................. 340/605 |
| 3,460,028 | A | * | 8/1969 | Beaver et al. ............ 324/220 |
| 3,480,300 | A | * | 11/1969 | Teague et al. ............. 285/93 |
| 3,483,466 | A | * | 12/1969 | Beaver et al. ............ 324/220 |
| 3,483,734 | A | * | 12/1969 | Wood ..................... 73/40.5 R |
| 3,495,546 | A | * | 2/1970 | Brown et al. ............. 104/155 |
| 3,496,457 | A | * | 2/1970 | Proctor et al. ............ 324/220 |
| 3,524,661 | A | * | 8/1970 | Farnam .................... 285/239 |
| 3,539,915 | A | * | 11/1970 | Wood et al. .............. 324/220 |
| 3,762,059 | A | * | 10/1973 | Dawson .................... 33/541 |
| 3,976,312 | A | * | 8/1976 | Murphree ................... 285/45 |
| 4,022,245 | A | * | 5/1977 | Davis ...................... 137/559 |
| 4,046,387 | A | * | 9/1977 | Lee ........................ 277/321 |
| 4,092,193 | A | * | 5/1978 | Brooks ..................... 156/83 |
| 4,150,847 | A | * | 4/1979 | De Cenzo .................. 285/93 |
| 4,401,326 | A | * | 8/1983 | Blair ...................... 285/318 |
| 4,422,477 | A | * | 12/1983 | Wittman et al. ............ 138/89 |
| 4,465,104 | A | * | 8/1984 | Wittman et al. ............ 138/89 |
| 4,690,434 | A | * | 9/1987 | Schmidt .................... 285/31 |
| 4,795,198 | A | * | 1/1989 | Hjelset .................... 285/32 |
| 4,804,206 | A | * | 2/1989 | Wood et al. ............... 285/13 |
| 4,852,391 | A | * | 8/1989 | Ruch et al. ............. 73/40.5 R |
| 4,854,611 | A | * | 8/1989 | Press ...................... 285/3 |
| 4,881,760 | A | * | 11/1989 | Runkles et al. ............ 285/93 |
| 4,888,990 | A | * | 12/1989 | Bryan et al. ............... 73/326 |
| 4,981,040 | A | * | 1/1991 | Lin ........................ 73/323 |
| D315,526 | S | * | 3/1991 | Esau ....................... D10/96 |
| 5,178,424 | A | * | 1/1993 | Klinger .................... 285/319 |
| 5,249,464 | A | * | 10/1993 | Brown et al. .............. 73/323 |
| 5,358,573 | A | * | 10/1994 | Sivacoe .................... 134/8 |
| 5,532,587 | A | * | 7/1996 | Downs et al. .............. 324/220 |
| 5,544,923 | A | * | 8/1996 | Bartholomew ............... 285/242 |
| 5,551,732 | A | * | 9/1996 | Bartholomew ............... 285/93 |
| 5,628,231 | A | * | 5/1997 | Sheridan ................... 73/323 |
| 6,457,532 | B1 | * | 10/2002 | Simpson .................... 166/380 |
| 6,523,862 | B1 | * | 2/2003 | MacDuff ................... 285/256 |
| 6,581,983 | B1 | * | 6/2003 | Viegener ................... 285/382 |
| 6,682,102 | B1 | * | 1/2004 | Betz ..................... 285/123.15 |
| 6,979,026 | B2 | * | 12/2005 | Kasahara et al. ........... 285/93 |
| 7,107,863 | B2 | | 9/2006 | Harthorn et al. |
| 7,314,237 | B2 | * | 1/2008 | Warden ..................... 285/93 |
| 7,475,591 | B2 | * | 1/2009 | Buckley et al. ............. 73/49.5 |
| 7,546,847 | B2 | * | 6/2009 | Morrison et al. ........... 137/317 |
| 7,654,219 | B2 | * | 2/2010 | Armstrong .................. 116/276 |
| 7,913,764 | B2 | * | 3/2011 | Smith et al. ............... 166/358 |
| 7,963,337 | B2 | * | 6/2011 | Pallini et al. ............. 166/367 |
| 7,987,903 | B1 | * | 8/2011 | Prado Garcia ............. 166/75.13 |
| 8,002,501 | B2 | * | 8/2011 | Dos Santos et al. ......... 405/211 |
| 2002/0157834 | A1 | * | 10/2002 | Gallagher et al. ........... 166/345 |
| 2004/0261547 | A1 | * | 12/2004 | Russell et al. ............. 73/865.8 |
| 2009/0208295 | A1 | * | 8/2009 | Kinert et al. ............. 405/224.2 |
| 2010/0018717 | A1 | * | 1/2010 | Espinasse et al. ........... 166/346 |
| 2010/0206064 | A1 | * | 8/2010 | Estes ..................... 73/152.57 |
| 2011/0061681 | A1 | * | 3/2011 | Cassidy .................... 134/8 |
| 2011/0113884 | A1 | * | 5/2011 | Marsden et al. ............. 73/623 |
| 2011/0127999 | A1 | * | 6/2011 | Lott et al. ................ 324/239 |
| 2011/0247826 | A1 | * | 10/2011 | McCann .................... 166/337 |
| 2012/0049509 | A1 | * | 3/2012 | Lininger et al. ............ 285/93 |
| 2013/0127452 | A1 | * | 5/2013 | Boenisch ................... 324/242 |

* cited by examiner

SCUTTLE FOR THE MONITORING AND INSPECTION OF A FLEXIBLE RISER

This application is a continuation of U.S. patent application Ser. No. 13/399,204, filed Feb. 17, 2012, which claims priority to Brazil Application No. PI 1100228-0, filed Feb. 18, 2011, the entire contents of which are hereby incorporated by reference.

FIELD OF THE INVENTION

The present invention relates to an apparatus for inspecting and monitoring flexible risers in real time. The apparatus renders possible constant tracking of the conditions of the internal structures of a riser, specifically of the tensile armour. The technology proposed reduces the risk of failure by virtue of it permitting the installation of diverse means of integrity monitoring directly on the structure of a riser, in addition to rendering possible local or remote visual inspections of the tensile armour wires.

FIELD OF THE INVENTION

In subsea production systems the petroleum produced in wells located on the bottom of the ocean is transported to a stationary production unit (SPU) by pipes. This assembly of electrohydraulic umbilical lines, water injection and oil and gas pumping pipes is conventionally denominated: collection and production line.

This assembly of pipes constituting the collection and production lines is basically subdivided into two distinct portions:

The first portion, preponderantly horizontal, denominated: the horizontal segment. This portion is conventionally static and also specifically known in the technical terminology as "the flowline".

The second portion, constituted by a preponderantly vertical pipe connected to the extremity of the horizontal segment and which ascends from the sea floor to the platform whereat it is connected, denominated: the vertical segment. The second portion is also known, and hereinafter denominated, by the technical terminology of "the riser".

The term vertical employed herein shall not have a strict interpretation by virtue of the fact that the distance between the platform and the point of connection to the flowline, allied with the weight of the riser itself, obliges this segment to assume a substantially curved configuration known as a catenary.

In the market there basically exist two types of riser: rigid and flexible, being affixed to the platform by support structures especially designed to support and resist the stresses thereof, which may result from both the weight and the movements thereof.

Illustratively, some of the more obvious factors acting on a riser are: action of internal pressure of the fluids and external pressure of the environment, internal friction between the diverse constituent layers thereof in the case of flexible risers, corrosion and fatigue. In addition to these factors there may be highlighted all types of influence from the environment wherein the structure is installed, such as marine currents, salinity, tidal variations, waves, infestation of live organisms.

Tides act specifically on the preponderantly vertical portion of the riser, subjecting it to considerable forces arising from displacement of the platform, which moves continuously in the vertical and horizontal directions.

In summary, the riser may be subjected to diverse loads such as: axial tension, weight of the structure itself, load resulting from waves, drag force due to currents, and corrosive effects of the environment and of the internal fluid. The majority of these stresses are cyclic and induce fatigue in the structure and it is for this reason that it requires to be periodically inspected.

Consequent upon the adoption of the system of flexible risers, further difficulties occur requiring solutions in relation to anchoring. This is by virtue of the fact that risers of the flexible type, resulting from the constructional configuration thereof, are much more sensitive than those which are rigid in terms of the diverse stresses whereto a riser is subjected.

These types of flexible riser are constituted by overlaying at least six interdependent layers having different compositions. The first and most internal is the internal carcass, followed by a polymer pressure layer. In sequence there follow the pressure armour, the internal tensile armour layer and external tensile armour layer composed of steel wires. Overlaid upon all the foregoing there is in addition an external polymer layer.

Currently, in order to affix the upper extremity of a flexible riser to the respective support thereof on the SPU, the extremity of the riser requires to be affixed to a device which will be the means of coupling and supporting between the riser itself and the support. This device is known in the technical environment as end fitting.

Consequently, there is a second scenario wherein the stresses resulting from the weight and movement of a riser are concentrated in this region. This region is represented by three components of a collection and production line, that is to say: a support, end fitting and the free extremity of a flexible riser. The three components interact with one another differently.

Whilst the support presents restricted freedom of movement in relation to the respective end fitting, it must interact in a fixed manner in relation to the six components forming the flexible riser. By virtue of the riser being such a critical element for production continuity and for the safety of the SPU itself and the environment, and at the same time being an element subjected to the most diverse stresses which may act simultaneously on the structure thereof, it is necessary that the riser be subjected to periodic meticulous inspection and if possible to continuous monitoring. The objective of this inspection and monitoring is to render it possible to detect early signs of fatigue and consequently take measures to mitigate or eliminate the stresses causing the problem.

Flexible risers are usually monitored by visual inspection. Such verifications are realised by divers and/or remotely operated vehicles. More recently, internal and external inspection robots have been adopted. These robots can be furnished with the most varied devices of non-destructive inspection commonly applied, such as: ultrasound apparatus or techniques based on induced magnetic fields or X-rays.

However, currently a new method permits the remote realisation of more intrinsic monitoring work through the use of optical fibres. This is one of the most recent technologies, disclosed by Brazilian patent document PI 0801011-0 of Nov. 30, 2010, for realising the monitoring of a riser, specifically of the tensile armour thereof.

The aforementioned method consists of furnishing fibre optic sensors adhered to the wires composing said tensile armour layer of risers. As a consequence of being a technique disposing the sensors intimately connected to the steel wire, and the former being extremely thin, it becomes possible to track all structural alterations of the steel wire and reveal the smallest degree of alteration which may be considered as a deformation.

In spite of being efficient in terms of results, this method however imposes certain restrictions representing a cost to be considered, by virtue of the quantity of risers in operation requiring monitoring.

Therefore, it is presented as a method which, depending on the data collection point, requires the execution of a cut in the external protective layer of the riser, which at the end of the procedure is restored by taping. This type of finishing represents a rupture of the integrity of the original external sealing without offering a reliable mechanical solution for the reinstatement of said sealing. Furthermore, there is the difficulty of it being a method which can only be applied offshore, which presents limitations. Finally, moreover there is the difficulty of carrying out maintenance on the fibres should it be necessary.

Patent documents such as U.S. Pat. No. 7,107,863 of Sep. 19, 2006 and PI 0801011-0 of Apr. 7, 2008 reveal examples of devices and/or apparatus designed to realise inspections from a position internal and external to the riser. However, to date there is no means available in the art to undertake a visual analysis of one of the components most subjected to fatigue: the tensile armour of the riser, whilst maintaining the integrity of its external sealing.

The history of the dissection of end fittings of risers which had been in operation or which were subjected to specification testing demonstrates that there is a critical section of failure of risers, principally located within the end fitting. It further demonstrates that this is precisely the section wherein the tensile armours suffer their greatest loads from cyclic fatigue stresses.

The concentration of tension occurring in this region accelerates the process of fatigue of the wires.

The present invention was developed in order to accommodate the monitoring systems and to enable a visual check of the flexible riser, preferably in the inner area of the end fitting.

In this respect, apparatus has been developed capable of rendering inspection of the tensile armour possible, preferentially in this critical area, whilst also maintaining the monitoring systems in a protected state.

The invention described below flows from continual research in this sector, the focus whereof being the objective of making available a further means of instantaneous detection and inspection of faults in risers. Additionally, it renders possible that the installation of the monitoring system on the risers be also realised onshore.

Moreover, it has the purpose of furnishing a new concept of inspection which may be adopted as a basis for new parameters.

Other objectives which the scuttle for the monitoring and inspection of a flexible riser, object of the present invention, proposes to achieve are listed below:

1. to permit direct visual inspection of the tensile armour of a riser;
2. to permit the application thereof onshore or offshore;
3. to permit not solely visual inspection but the installation of diverse means of inspection on the tensile armour in a hermetic manner;
4. to render possible total access for maintenance;
5. to render possible exchange of the means of inspection at any moment;
6. to maintain the integrity of the external sealing;
7. to be applicable to any segment of riser, whether new or in operation.

SUMMARY OF THE INVENTION

According to the present invention, there is provided a scuttle for the monitoring and inspection of a flexible riser, the scuttle comprising: an inspection chamber comprising at least two structural cells; an inspection window being attached over at least one of said structural cells; means of affixing and sealing the scuttle to a riser and/or to a riser accessory, the means of affixing and sealing being configured to interact with extremities of the inspection chamber and thereby establish a watertight connection between the inspection chamber and riser (150) and/or the riser accessory.

According to this aspect of the invention, it is possible to inspect a riser via the window, whilst simultaneously establishing a water-tight seal. This protects the section of the riser under inspection, which allows for the external layer of the riser (for example) to be removed to aid inspection of the riser.

The means of affixing and sealing can comprise an expansion sleeve located at an extremity of inspection chamber, for supporting and separating an external layer of riser from the remaining layers. The expansion sleeve assists in the exposure of an area of a riser that is under investigation.

The means of affixing and sealing can comprise a sealing ring, and the means of affixing and sealing can be further configured so that the sealing ring is made to compress, in use, an external layer of the riser against the expansion sleeve. By compressing the sealing ring against the riser, a water-tight seal can be formed.

The means of affixing and sealing can further comprise an activation flange superimposed on said sealing ring, to compress the sealing ring. The activation flange can be used to assist in the compression of the seal, thereby energising it and making it as water-tight as possible.

The extremity of inspection chamber can be provided with an internal bevel that receives the sealing ring. This allows for the seal between the ring and inspection member to be as tight as possible.

The means for affixing and sealing can be provided at both extremities of inspection chamber. That is, each end of the inspection chamber may be provided with an expansion sleeve, sealing ring, activation flange and bevel. This allows each end of the sealing chamber to be sealed against a riser. However, it may also be desirable for only one end of the inspection chamber to have such a seal, whilst the other end is configured to seal against a connector, for example. In that case, the means of affixing may comprise another seal at the end configured to seal against the connector.

Said means of affixing and sealing can comprise an extremity of inspection chamber configured to seal against a riser connector. This can be in combination with another sealing ring arrangement as discussed above.

The scuttle can further comprise said riser connector, wherein an internal bevel is provided in said connector, the bevel being configured to receive said sealing ring. This provides a tight seal between the sealing ring and the connector.

An outer casing of the connector can interact with said sealing ring to establishing a seal.

Each structural cell can comprise at least two spars aligned with the axis of riser, and each of the extremities of said spars can be connected to a structural ring so as to form said structural cells. This provides a strong frame for the structural cells, which can then support the window and attaching means.

The sealing ring can be provided on the internal face of a structural ring. That is, for example at one end of the scuttle, the seal can be made between the structural ring and riser, rather than between the extremity of the inspection chamber and the riser.

The structural ring can be configured to be connected directly to an outer casing of a/the connector, optionally by the structural ring being threaded.

The sealing ring can also seal a zone filled with resin of the connector.

The scuttle can be configured such that, in use, on connecting inspection window over structural cell empty space is formed over the surface of the riser.

The scuttle can be configured, in combination with the riser, to allow inspection of internal layers of said riser via said inspection window (230).

The present invention relates to apparatus capable of housing monitoring and inspection devices installed directly on the tensile armour of a riser, comprising two principal and distinct parts, that is to say: an inspection chamber as such and means of affixing and sealing to the riser or to another riser accessory.

The inspection chamber can optionally be composed of a structural chassis having a predominantly cylindrical format. Said structural chassis presents at least two spars aligned with the axis of the riser and parallel to the most external surface of said riser. Each of the extremities of the spars interconnect with a structural ring, each section of the structural ring interconnecting at least two contiguous spars, forming a structural cell.

Consequently, the structural chassis can comprise at least two contiguous structural cells distanced from the exposed surface of the riser.

An inspection window comprising a lamina having a channelled format is on structural cells forming an empty watertight space on the exposed surface of the riser.

A means of affixing and sealing constituted by at least an arrangement of elements which, by interacting with the free extremities of the inspection chamber, establishes a watertight connection between the latter and the riser or other riser accessory.

According to an aspect of the invention, there is provided a scuttle for the monitoring and inspection of a flexible riser, characterised in that it comprises: inspection chamber (210) as such, composed of structural chassis (220) of predominantly cylindrical format formed by at least two contiguous structural cells (223) distanced from the exposed surface of riser (150) and provided with a continuous surface of support throughout the entire perimeter thereof, each structural cell (223) comprising at least two spars (221) aligned with the axis of riser (150) and parallel to the most external surface of said riser, each of the extremities of said spars (221) being connected to structural ring (222) such as to form said structural cell (223); inspection window (230), constituted by a lamina having a channelled format, being attached over structural cells (223); and means of affixing and sealing (300) to riser (150) or to another riser accessory, constituted by an assembly of elements which, interacting in a specific arrangement with the free extremities of inspection chamber (210), establish a watertight connection between the latter and riser (150) or another riser accessory.

Optionally, the means of affixing and sealing (300) is constituted by expansion sleeve (400) of tubular format provided between the external layer (156) of riser (150) and overlaid tensile armour layers (154 and 155), supporting and separating external layer (156) of riser (150) from the remaining layers; the free extremity of inspection chamber (210) is provided with an internal bevel wherein it receives sealing ring (270) having the form of a wedge, there being superimposed thereon activation flange (280).

Optionally, spar (221) has a cross-section of varied configuration.

Optionally, structural rings (222) are provided with means of affixing (300) directly onto riser (150) itself or any of the accessories of said riser.

Optionally, on connecting inspection window (230) over structural cell (223) empty space (201) is formed over the exposed surface of the riser.

Optionally, the external face of spar (221) is coincident with the contact face of structural rings (222) such as to form a continuous surface of support on the edge of structural cells (223) along the entire perimeter of contact with inspection window (230).

Optionally, inspection window (230) has a channelled form, preferentially having a cylindrical section.

Optionally, inspection chamber (210) and means of affixing and sealing (300) to riser (150) or to another riser accessory are bipartite.

Optionally, means of affixing and sealing (300) is alternatively constituted by a free extremity of inspection chamber (210) turned towards the extremity of riser end fitting (500) and directly facing activation flange (280), said end fitting (500) being provided with an internal bevel wherein it receives sealing ring (270) having the form of a wedge, which interacts with the extremity of outer casing (510) of said end fitting (500) establishing sealing and limiting the zone filled with resin (520) of said connector.

Optionally, means of affixing and sealing (300) is moreover alternatively constituted by monitoring and inspection scuttle (200) threaded directly onto outer casing (510), visually exposing tensile armours (154 and 155) at a point immediately subsequent to zone filled with resin (520).

Optionally, structural ring (222) of inspection chamber (210), turned towards the extremity of end fitting (500) has provided on its internal face sealing ring (290) which establishes contact with the exposed surface of tensile armours (154 and 155), structural ring (222) being threaded directly onto the extremity of outer casing (510) such that sealing ring (290) is the element separating the zone filled with resin (520) from empty space (201) on the exposed surface of riser (150).

BRIEF DESCRIPTION OF THE DRAWINGS

The invention will be described later in greater detail in conjunction with the drawings listed below which, merely in terms of example, accompany this specification of which they form an integral part and wherein.

DETAILED DESCRIPTION OF THE INVENTION

The scuttle for the monitoring and inspection of a flexible riser, object of the present invention, has been developed based on research having the objective of rendering feasible means of monitoring a riser in real time and, at the same time, ensuring the integrity of the annular space of the riser with the due sealing thereof, by providing a display window and access for the installation of a type of analysis or monitoring device on the tensile armour.

As will become clear, the present invention can furnish means not solely of housing various analytical and monitoring equipments on the internal structure of the riser, but also rendering possible the direct inspection of the tensile armour thereof.

Figure 1:
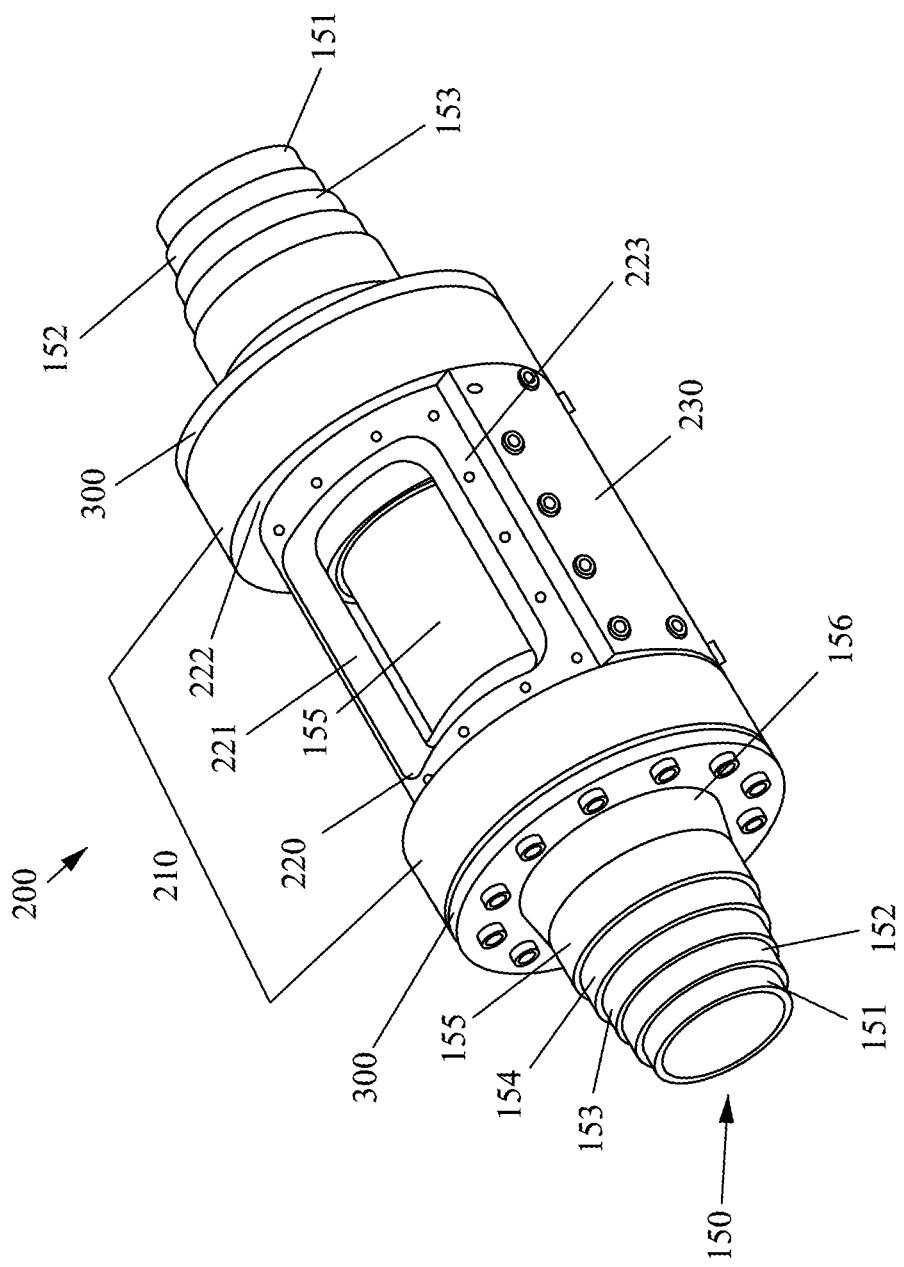
FIG. 1 depicts a perspective view of the device of the present invention.

The scuttle for monitoring and inspection (200) of a flexible riser, the basic configuration whereof is visualised in FIG. 1, has been developed from the possibility of furnishing a device (300) for affixing to and sealing the structure of a flexible riser (150).

The constitution of a riser currently existing in the market is basically composed of at least six interdependent layers having different compositions: the first and most internal being the internal carcass (151), followed by a polymer pressure layer (152). In sequence there follow the pressure armour (153), the internal tensile armour layer (154) and the external tensile armour layer (155) composed of steel wires. Overlaid upon all the foregoing there is furthermore an external polymer layer (156).

Figure 2:
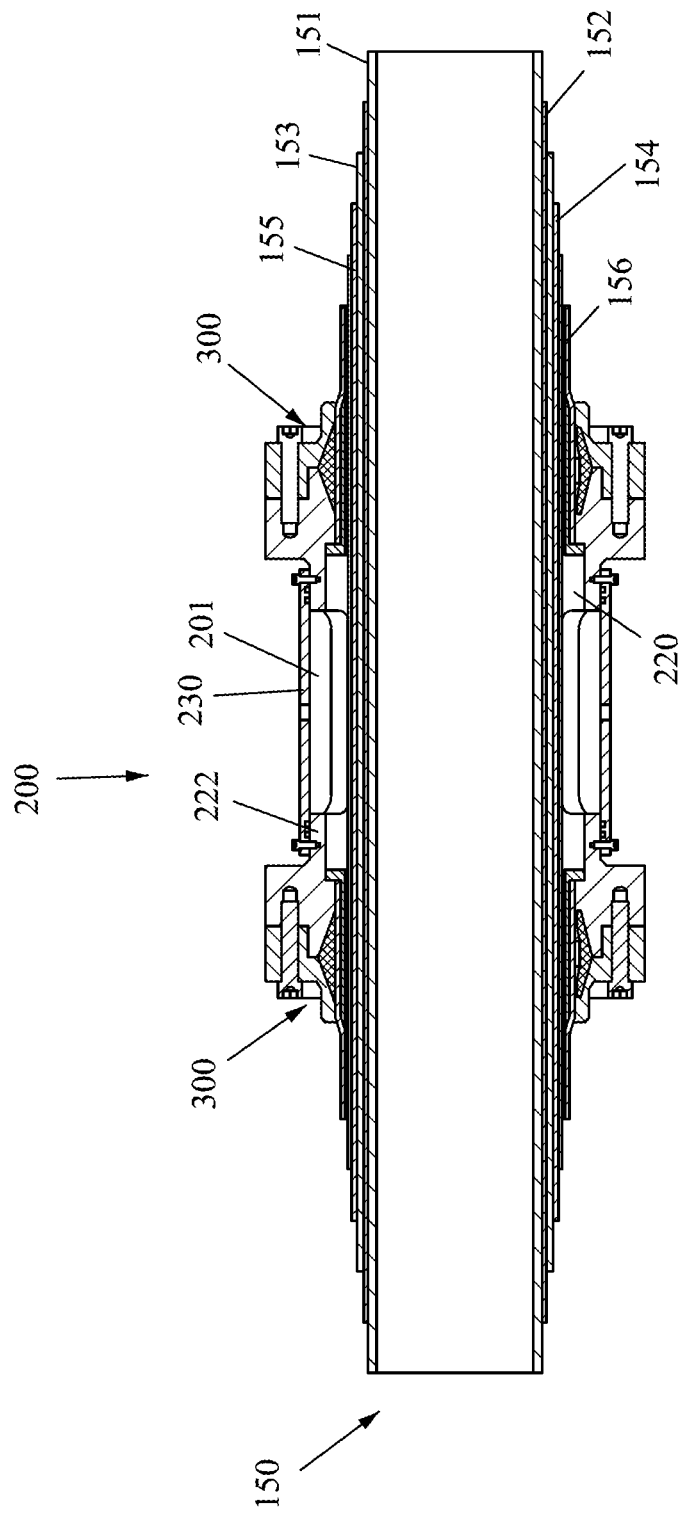
FIGS. 2 and 2A depict longitudinal cross-sectional views of the device of the present invention.

As may be observed in FIG. 1 or in FIG. 2, the scuttle for monitoring and inspection (200) of a flexible riser, herein proposed, comprises two principal and distinct parts, that is to say: the inspection chamber (210) as such and means of affixing and sealing (300) to the riser (150) or to another riser accessory.

As will be disclosed later, and easily visualised by means of FIG. 1 and accompanied concomitantly by FIG. 2 wherein the device is shown in cross-section, the present new concept of inspection and monitoring can render possible the formation of a watertight chamber directly upon tensile armours (154) and (155), at any part of a riser, based on the activation of a means of affixing and sealing (300) capable of being provided preferentially on the structure of a flexible riser.

Consequently, an inspection chamber (210) is composed of a structural chassis (220). Chassis (220) can be of predominantly cylindrical format. Said structural chassis (220) can present at least two spars (221). Spars (221) can be substantially aligned with the axis of riser (150). The spars (221) can also be substantially parallel to the most external surface of said riser.

Each of the extremities of spars (221) can interconnect with a structural ring (222). The structural rings (222) can each, in turn, be provided with means of affixing (300) to the riser itself (150) and/or to one of the accessories of said riser.

Each section of structural rings (222), interconnected to at least two contiguous spars (221), forms a structural cell (223). The structural cell (223) can have a continuous surface of support. That is, a structural cell (223) can be formed by connecting at least two contiguous spars (221) to two structural rings (222). The structural cell (223) can be attached to the riser (150) by the means of affixing (300).

Consequently, structural chassis (220), which may be bipartite, comprises at least two contiguous structural cells (223), which may be distanced from the exposed surface of riser (150). As such, on attaching an inspection window (230) to the respective structural cells (223) there is formed an empty space (201) on the external, exposed, surface of the riser, represented by tensile armours (154 and 155). This empty space (201) can be seen in FIG. 2.

Spar (221) may have a cross-sectional profile of varied configuration. However the external face thereof is preferentially coincident with the contact face of structural rings (222) such as to form a continuous surface of support at the edge of structural cells (223), along the entire perimeter entering into contact with inspection window (230).

Inspection window (230) can be constituted by a lamina, being a thin layer of material. The lamina can have a channelled format, preferentially the section of a cylinder. That is, the lamina can be shaped to form a channel, so as to fit around the structural chassis (220). The edge of the lamina can establish contact with and can seal the entire perimeter of at least one structural cell (223) and, consequently, with said structural rings (222) and spars (221) composing it.

Figure 2A:
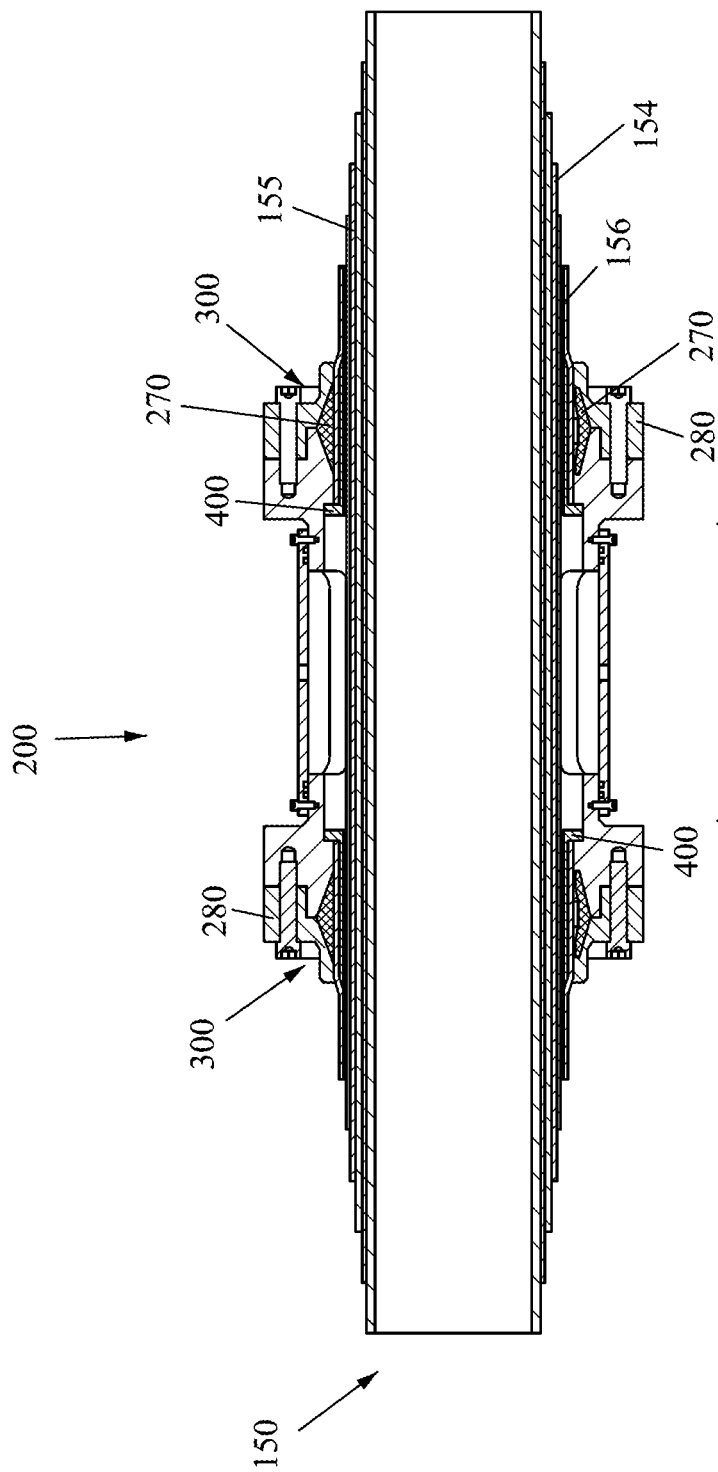

The means of affixing and sealing (300) to riser (150), which may be bipartite, is better visualised and understood through the assistance of FIG. 2A. In FIG. 2A the device is shown in cross-section. Said means of affixing and sealing (300) is constituted preferentially by an assembly of elements. This assembly of elements, by interacting in a specific arrangement with the free extremities of inspection chamber (210), establish a watertight connection between the latter and riser (150).

In a preferred embodiment, external layer (156) of riser (150) is protected and separated from the remaining layers of riser (150) by expansion sleeve (400) of tubular format furnished between said external layer (156) and overlaid tensile armour layers (154 and 155).

The free extremity of inspection chamber (210) is provided with an internal bevel wherein it receives a sealing ring (270). Sealing ring (270) can have the form of a wedge. Superimposed upon sealing ring (270) can be activation flange (280). Activation flange (280), on being pressed against the free extremity of said inspection chamber (210), can make sealing ring (270) compress external layer (156) of the riser against expansion sleeve (400).

This operating principle of means of affixing and sealing (300) to riser (150), as revealed by the arrangement described above, provided at both extremities of inspection chamber (210), distinguishes the basic constructional configuration of the scuttle for monitoring and inspection (200). The scuttle (200) may be installed at any point of a flexible riser.

Consequently, if required for purposes of calibration and control or even for research purposes, diverse types of monitoring or non-destructive testing devices may be disposed directly on the tensile armour in a watertight manner at any part of a riser, furthermore rendering possible visual access.

Figure 3:
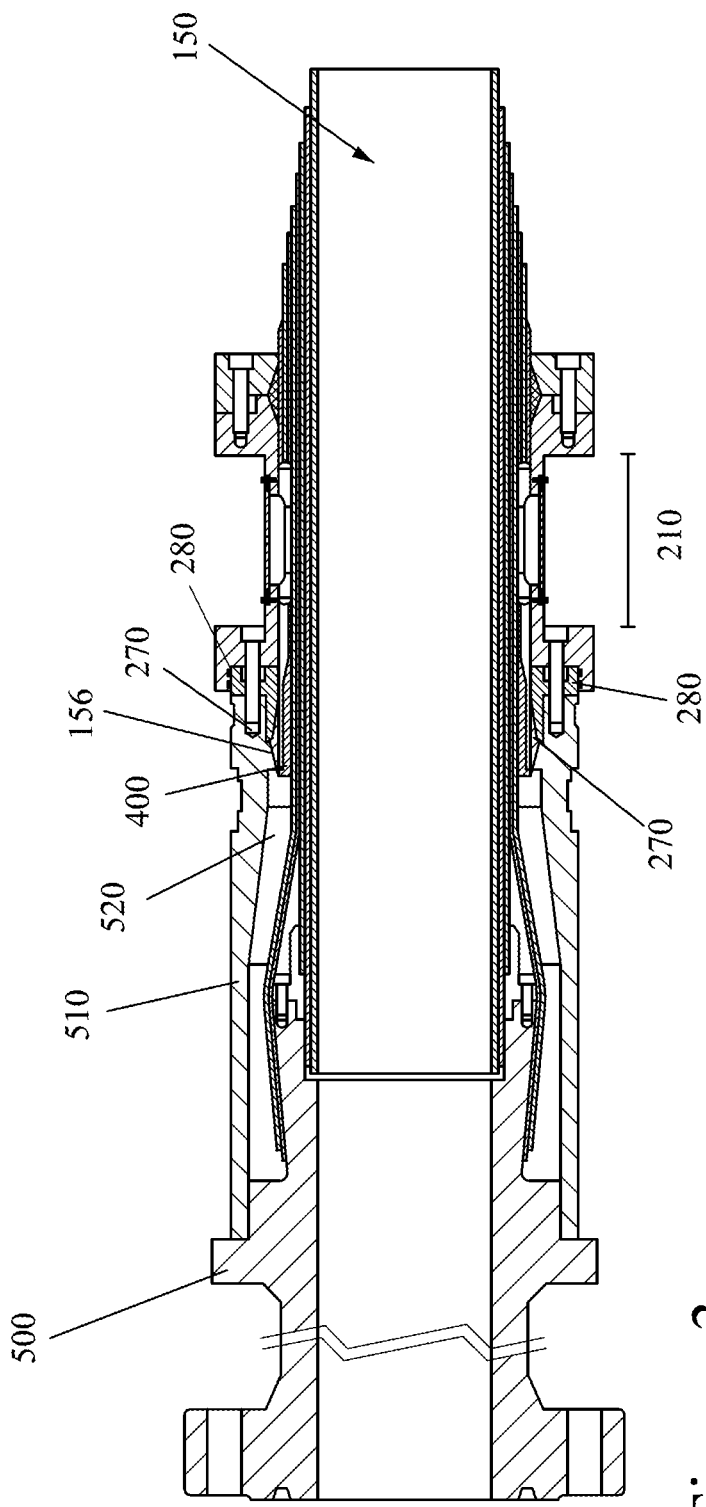
FIG. 3 depicts a cross-sectional view of a constructional alternative of the present invention.

FIG. 3 discloses an alternative for affixing and application of scuttle for monitoring and inspection (200).

In application of the same operating principle of means of affixing and sealing (300), the respective constructional elements having however been rearranged, one of the extremities of inspection chamber (210) may be affixed and sealed directly at the extremity of end fitting (500) of a flexible riser. That is, the scuttle (200) may be attached to both the riser (150) and the end fitting (500), rather than only on the riser (150) itself.

In this manner a critical section of flexible riser, subject to a considerable and a varied total of stresses, may be monitored and inspected.

For this, as also visualised in FIG. 3, the free extremity of inspection chamber (210) turned towards the extremity of end fitting (500) directly faces activation flange (280). Activating flange (280) is provided with an internal bevel wherein it receives sealing ring (270), which can have the form of a wedge. The sealing ring (270) can interact with the extremity of outer casing (510) of said end fitting (500). On pressing inspection chamber (210) against outer casing (510), sealing ring (270) can be made to compress external layer (156) of the riser against expansion sleeve (400), activating and establishing sealing.

In this constructional configuration the extremity of expansion sleeve (400) will serve as limit for the zone filled with resin (520) of end fitting (500), which is filled with resin.

Figure 4:
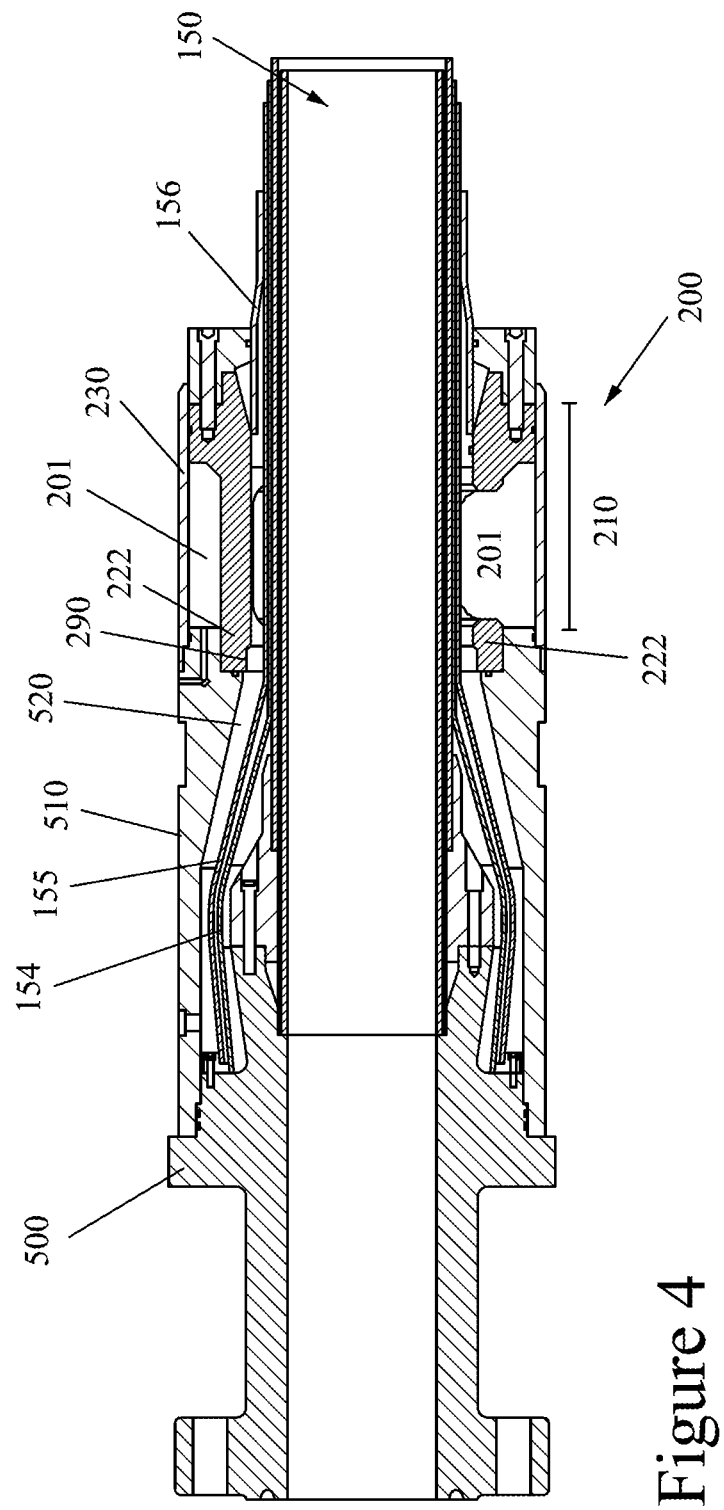
FIG. 4 depicts a cross-sectional view of a second constructional alternative of the present invention.

A second constructional alternative, optimised and requiring greater interaction with the design of end fitting (500), is revealed by FIG. 4. The alternative proposes a monitoring and inspection scuttle (200) threaded directly onto outer casing (510), visually exposing tensile armours (154 and 155) at a point immediately subsequent to the section suffering the greatest stress in the production line: the zone filled with resin (520) and adhesion.

From FIG. 4 it may be noted that structural ring (222) of inspection chamber (210), at the end of the scuttle (200) towards the extremity of end fitting (500), is provided on the internal face thereof with a sealing ring (290). Sealing ring (290) establishes contact with the exposed surface of tensile armours (154 and 155). Subsequently, structural ring (222) is threaded directly on to the extremity of outer casing (510).

Consequently, sealing ring (290) is the element separating the zone filled with resin (520) from empty space (201) on the exposed surface of riser (150).

It may be easily perceived that the present invention not solely provides a watertight space around the entire perimeter of the tensile armour of a riser, but principally renders the mounting procedure very much more simple, rapid and realisable on lines in operation.

Consequently, one of the unquestionable advantages of the invention proposed is not solely having the possibility of selecting the point of mounting, but also the assurance that, in spite of establishing an area of physical and visual contact directly upon the tensile armour surface of the riser, this area renders possible new accesses without destroying the sealing thereof.

The invention has been described herein with reference being made to the preferred embodiments thereof. Nevertheless, it will be clear that the invention is not limited to those embodiments and those skilled in the art will immediately perceive that alteration and substitution may be implemented without departing from the inventive defined in the claims.

The invention claimed is:

1. A scuttle for the monitoring and inspection of an external tensile armour layer of a flexible riser, the scuttle comprising:
    an inspection chamber comprising at least two structural cells;
    an inspection window being attached over at least one of said structural cells and being installed directly on the external tensile armour layer of the flexible riser, wherein the flexible riser comprises an external layer radially outwardly of the external tensile armour layer where the inspection window is not installed, such that the inspection window allows for monitoring of the external tensile armour layer;
    the inspection chamber being attached via a watertight connection to the flexible riser or riser accessory, the watertight connection being configured to interact with a first extremity of the inspection chamber.

2. The scuttle for the monitoring and inspection of an external tensile armour layer of a flexible riser according to claim 1, wherein the watertight connection comprises an expansion sleeve located at the first extremity of inspection chamber, for supporting and separating the external layer of the flexible riser from the external tensile armour layer of the flexible riser.

3. The scuttle for the monitoring and inspection of an external tensile armour layer of a flexible riser according to claim 2, wherein said watertight connection comprises a sealing ring, and the watertight connection is further configured so that the sealing ring is made to compress, in use, the external layer of the flexible riser against the expansion sleeve.

4. The scuttle for the monitoring and inspection of an external tensile armour layer of a flexible riser according to claim 3, wherein said watertight connection further comprises an activation flange superimposed on said sealing ring, to compress the sealing ring.

5. The scuttle for the monitoring and inspection of an external tensile armour layer of a flexible riser according to claim 4, wherein the first extremity of the inspection chamber is provided with an internal bevel that receives the sealing ring.

6. The scuttle for the monitoring and inspection of an external tensile armour layer of a flexible riser according claim 2, wherein the inspection chamber comprises a second extremity, wherein said watertight connection is provided at both the first and second extremities of the inspection chamber.

7. The scuttle for the monitoring and inspection of an external tensile armour layer of a flexible riser according to claim 1, wherein said watertight connection comprises the first extremity of the inspection chamber configured to seal against a flexible riser end fitting.

8. The scuttle for the monitoring and inspection of an external tensile armour layer of a flexible riser according to claim 7, wherein the watertight connection comprises a sealing ring, the scuttle further comprising an internal bevel provided in said flexible riser end fitting, the internal bevel being configured to receive said sealing ring.

9. The scuttle for the monitoring and inspection of an external tensile armour layer of a flexible riser according to claim 8, wherein an outer casing of the watertight connection interacts with said sealing ring to establishing a seal.

10. The scuttle for the monitoring and inspection of an external tensile armour layer of a flexible riser according to claim 1, wherein each of the at least two structural cells comprises at least two spars aligned with an axis of the flexible riser, each of the at least two spars having extremities, and each of the extremities of said at least two spars are connected to a structural ring so as to form said structural cells.

11. The scuttle for the monitoring and inspection of an external tensile armour layer of a flexible riser according to claim 10, wherein a sealing ring is provided on the internal face of the structural ring.

12. The scuttle for the monitoring and inspection of an external tensile armour layer of a flexible riser according to claim 11, wherein the structural ring is configured to be connected directly to an outer casing of a flexible riser end fitting by the structural ring being threaded.

13. The scuttle for the monitoring and inspection of external tensile armour layer of a flexible riser according to claim 12, wherein the sealing ring also seals a zone filled with resin of the flexible riser end fitting.

14. The scuttle for the monitoring and inspection of an external tensile armour layer of a flexible riser according to claim 1, wherein the scuttle is configured such that, in use, on connecting the inspection window over at least one of the at least two structural cells an empty space is formed over the surface of the flexible riser.

15. The scuttle for the monitoring and inspection of an external tensile armour layer of a flexible riser according to claim 1, further comprising said flexible riser, and wherein the scuttle is configured to allow inspection of internal layers of said flexible riser via said inspection window.

* * * * *